United States Patent
Yang

(10) Patent No.: US 8,778,251 B2
(45) Date of Patent: Jul. 15, 2014

(54) METHOD AND APPARATUS FOR MANUFACTURING ONE-PIECE SHOE SHELLS HAVING DIFFERENT WIDTHS

(75) Inventor: Hsin-Chih Yang, Kaohsiung (TW)

(73) Assignee: Sakurai Sports Mfg. Co., Ltd., Kaohsiung (TW)

( * ) Notice: Subject to any disclaimer, the term of this patent is extended or adjusted under 35 U.S.C. 154(b) by 699 days.

(21) Appl. No.: 12/807,790

(22) Filed: Sep. 13, 2010

(65) Prior Publication Data

US 2012/0060305 A1 Mar. 15, 2012

(51) Int. Cl.
*A43D 8/00* (2006.01)
*A43B 5/00* (2006.01)

(52) U.S. Cl.
USPC ............ 264/294; 12/146 B; 12/142 P; 36/97; 36/154

(58) Field of Classification Search
USPC ....... 264/328.1, 294; 12/146 B, 142 P; 36/97, 36/154
See application file for complete search history.

(56) References Cited

U.S. PATENT DOCUMENTS

| | | | | |
|---|---|---|---|---|
| 1,482,457 A * | 2/1924 | Bigoney | ......................... | 36/35 R |
| 5,396,675 A * | 3/1995 | Vincent et al. | ............... | 12/142 P |
| 5,714,098 A * | 2/1998 | Potter | .......................... | 264/40.1 |
| 5,829,171 A * | 11/1998 | Weber et al. | ...................... | 36/93 |
| 8,303,885 B2 * | 11/2012 | Hatfield et al. | ............. | 264/328.1 |
| 2002/0144431 A1* | 10/2002 | Knoerr | ................................. | 36/31 |
| 2004/0261297 A1* | 12/2004 | Park | ................................. | 36/87 |
| 2005/0257405 A1* | 11/2005 | Kilgore | ............................. | 36/97 |
| 2006/0143950 A1* | 7/2006 | Beak | ................................. | 36/97 |
| 2010/0175277 A1* | 7/2010 | Langvin | ............................ | 36/97 |

* cited by examiner

*Primary Examiner* — Jill Heitbrink
(74) *Attorney, Agent, or Firm* — Klein, O'Neill & Singh, LLP

(57) ABSTRACT

A method for manufacturing a one-piece shoe shell of a skate with different widths having acts of forming a shoe shell with a rudimentary mold assembly, ejecting the shoe shell from the rudimentary mold assembly and adjusting a width of the sole of the shoe shell before the shoe shell hardens. The sole of the shoe shell has at least one adjusting portion to allow the sole to expand or be compressed. With the acts, each size of the shoe shell needs only one rudimentary mold assembly that has complex structure and high cost to substantially form a basic shape of the shoe shell and multiple shaping molds of different widths that have simple structure and low cost are prepared to further adjust widths of the shoe shell. Consequently, total cost for manufacturing the shoe shell with different widths is effectively lowered.

23 Claims, 6 Drawing Sheets

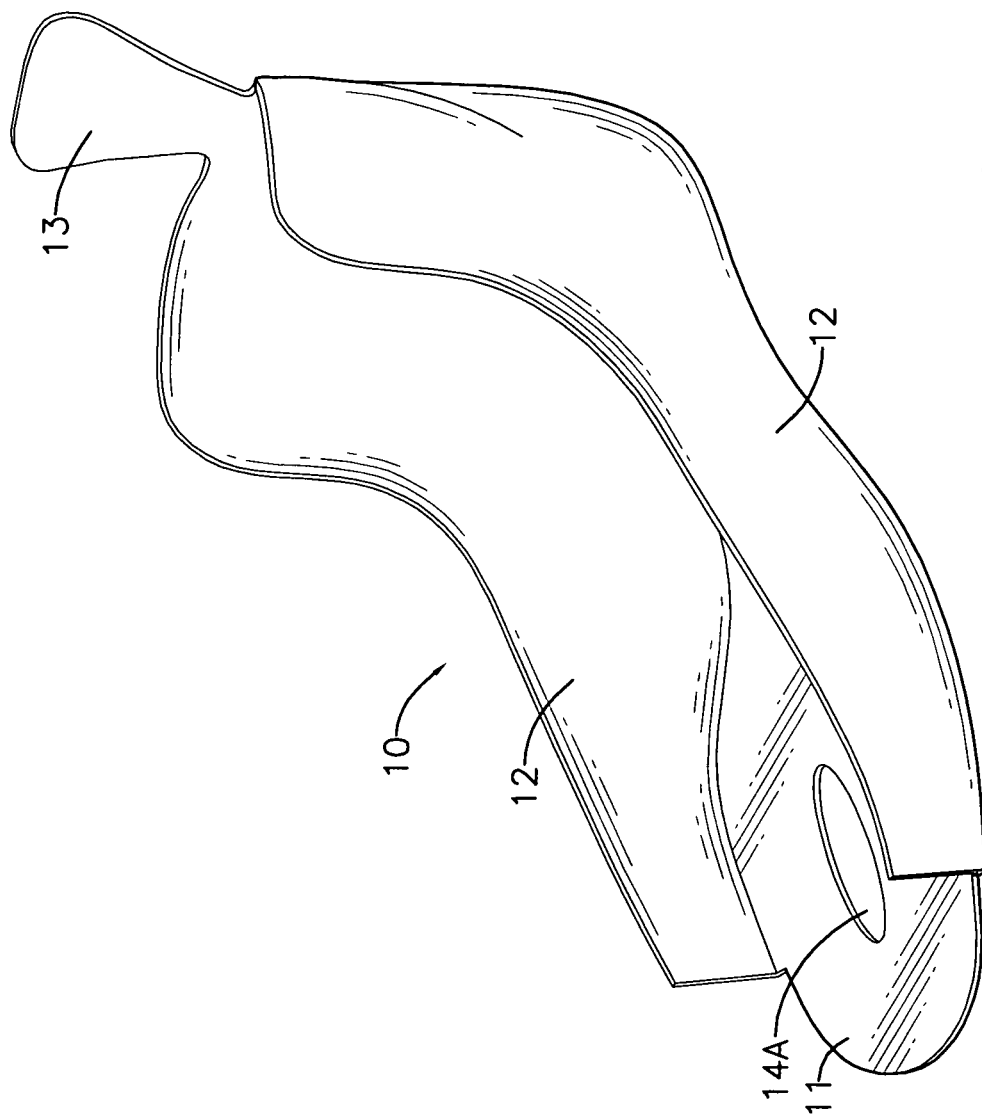

METHOD AND APPARATUS FOR MANUFACTURING ONE-PIECE SHOE SHELLS HAVING DIFFERENT WIDTHS

BACKGROUND OF THE INVENTION

1. Field of the Invention

The present invention relates to a method for manufacturing a one-piece shoe shell of a skate, especially to a method for manufacturing one-piece shoe shells of different width for each size of the shoe shell at ball area and heel area.

2. Description of the Prior Art(s)

People wear shoes to protect their feet from injury. Different kinds of shoes are adapted for different uses. For instance, athletic shoes are adapted for walking, running, hiking, climbing and other athletic activities. As for some sports, such as ice skating, inline skating or the like, a skate with a rigid shoe shell is needed for sufficient protection.

A conventional method for manufacturing a one-piece shoe shell of a skate is preparing a mold assembly comprising an outer mold and an inner mold, and then injecting molten plastic material into a mold cavity defined between the outer mold and the inner mold. When the molten plastic material in the mold cavity hardens, a one-piece shoe shell is completed. However, since people have feet with different sizes and widths at ball area and heel area, a lot of mold assemblies in different sizes and having different widths for each size are required to manufacture the one-piece shoe shells with different sizes and widths to fit different shapes of feet and make it comfortable while wearing the skates. Thus, manufacturing costs for manufacturing the shoe shells are high.

To overcome the shortcomings, the present invention provides a method for manufacturing a one-piece shoe shell of a skate with different widths to mitigate or obviate the aforementioned problems.

SUMMARY OF THE INVENTION

The main objective of the present invention is to provide a method for manufacturing a one-piece shoe shell of a skate with different widths that has acts of: forming a shoe shell with a rudimentary mold assembly, ejecting the shoe shell from the rudimentary mold assembly and adjusting the width on the sole of the shoe shell before the shoe shell hardens. The sole of the shoe shell has at least one adjusting portion of slit-typed or hole-typed to allow the sole to expand or be compressed.

With the method for manufacturing the one-piece shoe shell with different widths, each size of shoe shell needs only one rudimentary mold assembly that has complex structure and high cost to substantially form a basic shape of the size of shoe shell and multiple shaping molds of different widths that have simple structure and low cost are prepared to further adjust widths of the size of shoe shell. Consequently, total cost for manufacturing the size of shoe shell with different widths is effectively lowered.

Other objectives, advantages and novel features of the invention will become more apparent from the following detailed description when taken in conjunction with the accompanying drawings.

BRIEF DESCRIPTION OF THE DRAWINGS

FIG. 6 is a perspective view of the one-piece shoe shell of the skate manufactured through the method in FIG. 1.

DETAILED DESCRIPTION OF THE PREFERRED EMBODIMENTS

Figure 1:
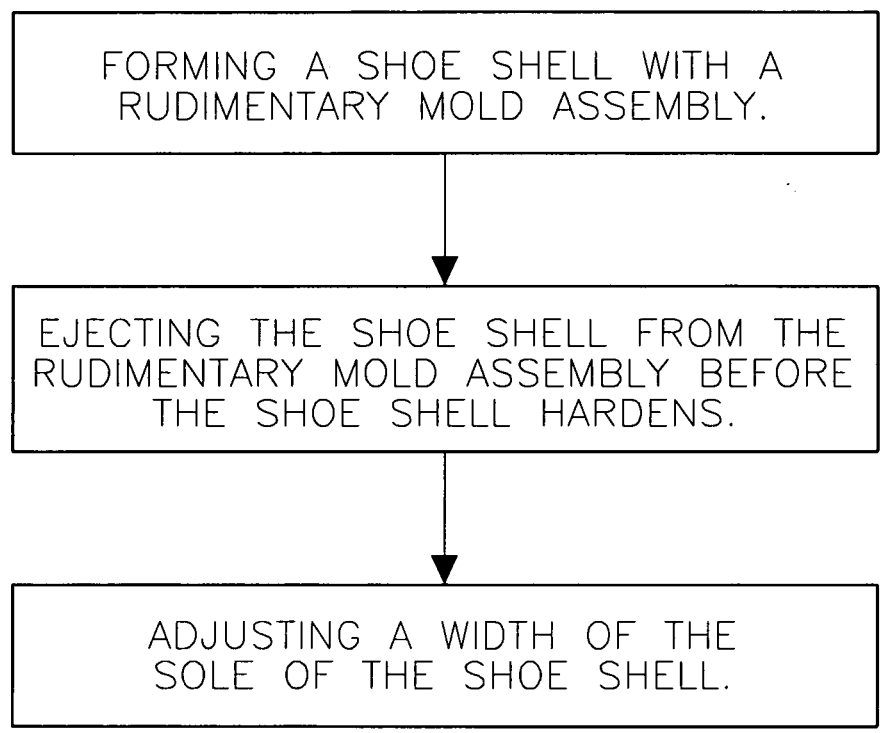
FIG. 1 is a flow chart of a method for manufacturing a one-piece shoe shell of a skate with different widths in accordance with the present invention.

With reference to FIG. 1, a method for manufacturing a one-piece shoe shell of a skate with different widths in accordance with the present invention comprises the following acts.

Figure 2:
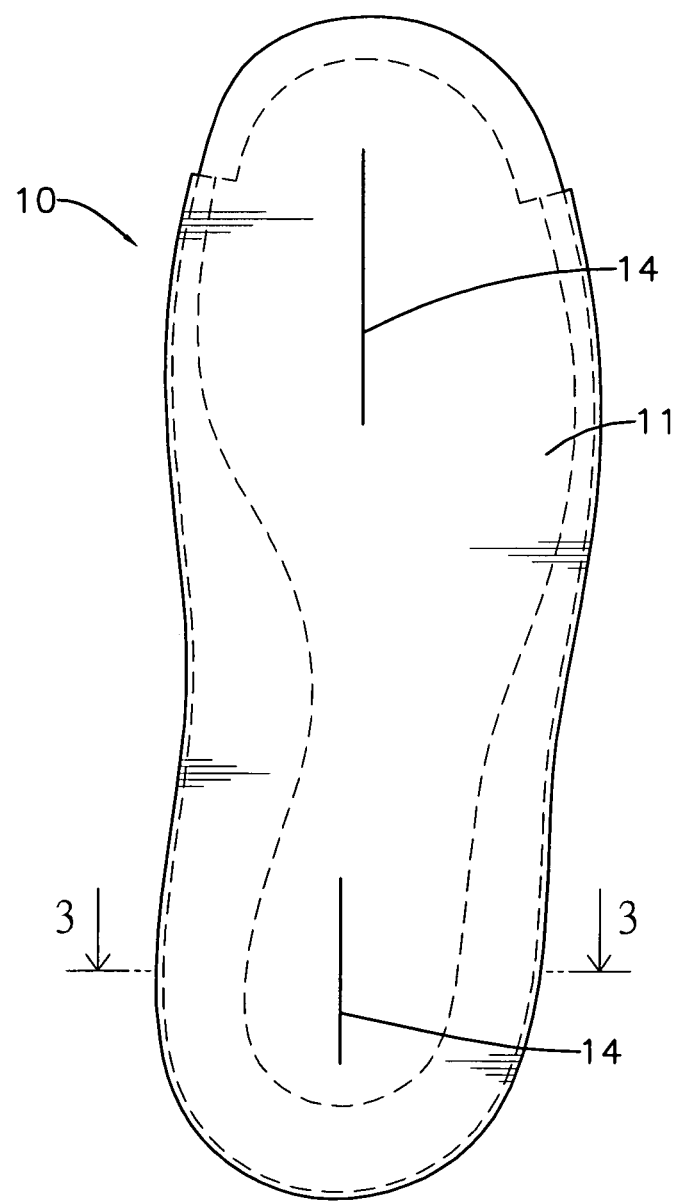
FIG. 2 is a bottom view of the one-piece shoe shell of the skate formed in a first step of the method in FIG. 1.
Figure 3:
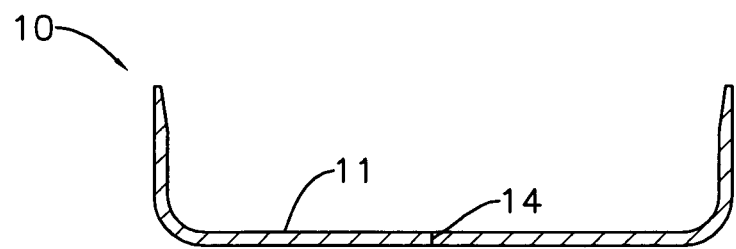
FIG. 3 is a cross-sectional end view of the one-piece shell of the skate along line 3-3 in FIG. 2.

(a) With further reference to FIGS. 2, 3 and 6, forming a shoe shell 10 with a rudimentary mold assembly. The rudimentary mold assembly has an outer mold, an inner mold and at least one partition. The inner mold is combined with the outer mold to form a mold cavity in the rudimentary mold assembly. The at least one partition is disposed between the outer mold and the inner mold in the mold cavity.

Then, injecting molten plastic material into the mold cavity to form the shoe shell 10 that has a sole 11, two lateral vamps 12 and a rear protection sheet 13. The sole 11 has at least one adjusting portion 14. The at least one adjusting portion 14 is defined at where the at least one partition of the rudimentary mold assembly disposed, is formed through the sole 11 and adjacent to an end, such as a front end or a rear end, of the sole 11 and may be slit-typed or hole-typed. The lateral vamps 12 respectively extend up from two opposite side edges of the sole 11. The rear protection sheet 13 extends up from the rear end of the sole 11 and is attached to the lateral vamps 12.

(b) Ejecting the shoe shell 10 from the rudimentary mold assembly.

(c) Adjusting a width on the sole 11 of the shoe shell 10 with a shaping device before the shoe shell 10 hardens.

Figure 4:
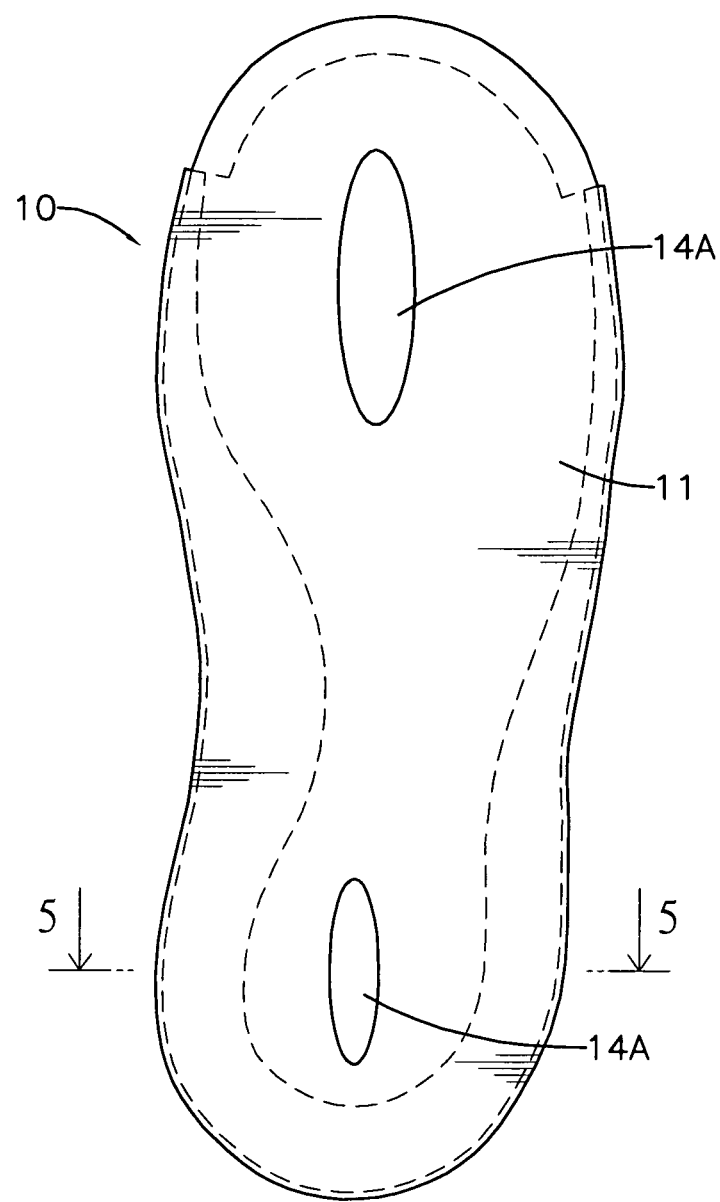
FIG. 4 is a bottom view of the one-piece shoe shell of the skate formed in a second step of the method in FIG. 1.
Figure 5:
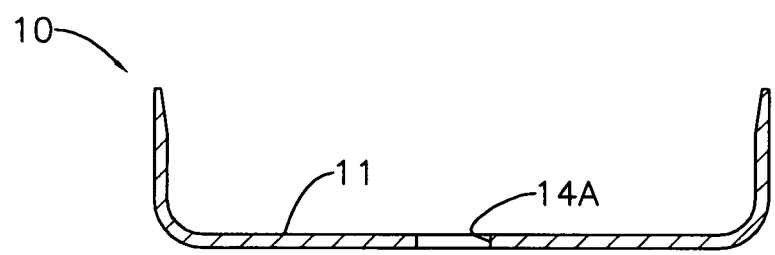
FIG. 5 is a cross-sectional end view of the one-piece shell of the skate along line 5-5 in FIG. 4.

With further reference to FIGS. 4 and 5, when each of the at least one adjusting portion 14 of the sole 11 is slit-typed, the shaping device for the shoe shell 10 is a shaping mold. The way to adjust the width on the sole 11 is mounting the shoe shell 10 in the shaping mold and then expanding the sole 11 of the shoe shell 10 to correspond to the shaping mold. The at least one slit-typed adjusting portion 14 of the sole 11 allows the front end and/or the rear end of the sole 11 to expand to correspond to the shaping mold and become hole 14A after the sole 11 is expanded. Therefore, the width of the shoe shell 10 that corresponds to a ball area and/or a heel area of a foot is adjusted.

In the preferred embodiment, the rudimentary mold assembly has two partitions and the sole 11 of the shoe shell 10 has two adjusting portions 14 formed respectively adjacent to the front and the rear of the sole 11. Thus, the widths of the shoe shell 10 that correspond to the ball area and the heel area of the foot are adjusted simultaneously.

In another preferred embodiment, the rudimentary mold assembly has one partitions and the sole 11 of the shoe shell 10 has one adjusting portion 14. Preferably, the adjusting portion 14 is formed adjacent to the front of the sole 11 so the ball area of the foot is able to be adjusted.

Another preferred embodiment to form the at least one adjusting portion 14 of the sole 11 is to form a shoe shell 10 without the at least one adjusting portion 14 on the sole 11 while forming the shoe shell 10 in the rudimentary mold assembly. Then, when the shoe shell 10 is mounted in the shaping mold, heating the shoe shell 10 soft and slitting the sole 11 to form the at least one adjusting portion 14 on the sole 11 of the shoe shell 10.

Furthermore, when the at least one adjusting portion 14 of the sole 11 is hole-typed, the shaping device for the shoe shell 10 comprises two pressing molds. The way to adjust the width of the sole 11 is pressing the shoe shell 10 with the pressing molds. The at least one hole-typed adjusting portion 14 of the sole 11 allows the front end and/or the rear end of the sole 11 to be compressed corresponding to the pressing molds where the at least one hole-typed adjusting portion 14 becomes a narrower shape or a slit after the sole 11 is compressed. Therefore, the width of the shoe shell 10 that corresponds to the ball area and/or the heel area of the foot is also adjusted.

The method for manufacturing a one-piece shoe shell of a skate with different widths has the following advantages. Each size of shoe shell 11 needs only one rudimentary mold assembly that has complex structure and high cost to substantially form a basic shape of the size of shoe shell 10. Then multiple shaping molds of different widths that have simple structure and low cost are prepared to further adjust widths of the size of shoe shell 10. Consequently, total cost for manufacturing the size of shoe shell 10 with different widths is effectively lowered.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of making a skate, comprising:
   forming a one-piece shell comprising a sole and two vamps extending from the sole, the sole having a first sole width defined between the vamps at a first location along the length of the sole, a forward edge of the vamps being spaced from a toe end of the sole and extending contiguously to a heel end of the sole, forming the one-piece shell comprising injecting molten plastic into a mold cavity defined between an inner mold and an outer mold;
   forming an adjusting portion in the sole at the first location along the length of the sole, the adjusting portion comprising an aperture formed through the sole, the aperture having a first aperture width;
   ejecting the shell from the mold cavity before the plastic hardens;
   mounting the shell in one of a plurality of shaping devices before the plastic hardens, the shaping device comprising a shaping mold; and
   before the plastic hardens stretching or compressing the shell at the first location along the length of the sole so that a shape of the shell changes to correspond to the shaping mold, and the sole has a second sole width defined between the vamps at the first location along the length of the sole and the aperture has a second aperture width, the second sole width being different than the first sole width and the second aperture width being different than the first aperture width.

2. The method of claim 1, wherein forming the adjusting portion comprises cutting an aperture through the sole.

3. The method of claim 2, wherein the aperture is a slit.

4. The method of claim 1 additionally comprising allowing the one-piece shell to harden while it maintains the second width at the first location.

5. The method of claim 1, wherein forming the adjusting portion comprises arranging a partition in the cavity prior to injecting molten plastic so that the aperture is formed through the sole in the cavity.

6. The method of claim 5, wherein the aperture comprises a slit.

7. The method of claim 1, wherein forming the adjusting portion comprises making a slit through the sole after the one-piece shell is ejected from the cavity.

8. The method of claim 7 additionally comprising heating the one-piece shell prior to making the slit or hole.

9. The method of claim 1, wherein the adjusting portion is a ball adjusting portion positioned in a ball portion of the one-piece shell sole, and additionally comprising forming a heel adjusting portion positioned in a heel portion of the one-piece shell sole.

10. The method of claim 3, wherein stretching or compressing the shell at the first location along the length of the sole comprises expanding the sole of the shell to correspond to the shaping mold.

11. The method of claim 6, wherein stretching or compressing the shell at the first location along the length of the sole comprises expanding the sole of the shell to correspond to the shaping mold.

12. The method of claim 1, wherein the shaping device comprises two pressing molds, and stretching or compressing the shell at the first location along the length of the sole comprises compressing the shell to a shape corresponding to the pressing molds.

13. The method of claim 1, wherein the plurality of shaping devices each correspond to a different sole width, and additionally comprising selecting the one of the plurality of shaping devices associated with a desired sole width.

14. A method of making a sports boot having a hardened one-piece shell, comprising:
   forming a one-piece shell from material comprising a plastic that hardens from a soft state in which the plastic can be stretched or compressed to a hardened state in which the plastic cannot be stretched or compressed, forming the shell comprising injection-molding the one-piece shell in a mold cavity and ejecting the shell from the mold cavity, the one-piece shell having a sole and two vamps extending from the sole, the sole having a longitudinal axis and a transverse axis and having opposing side edges, a first sole width defined as the transverse distance between the opposing side edges at a first location along the length of the sole, the first location being in one of a ball and a heel area of the sole, a forward edge of each vamp being spaced from a toe end of the sole and extending contiguously to a heel end of the sole;
   forming an aperture through the sole at the first location along the length of the sole, the aperture having a first aperture width;
   mounting the one-piece shell on a shaping device, the shaping device comprising a shaping mold;
   heating the one-piece shell so that the plastic is in the soft state;
   when the one-piece shell is mounted on the shaping device, stretching or compressing the soft sole of the shell transversely at the first location along the length of the sole when the plastic is in the soft state so that the sole at and adjacent the aperture deforms and a shape of the shell changes to correspond to the shaping mold and the sole of the shell takes on a second sole width at the first location that is different than the first sole width and the aperture takes on a second aperture width at the first location that is different than the first aperture width;

allowing the plastic to harden after the step of stretching or compressing so that the sole maintains the second sole width and second aperture width when the plastic is in the hardened state; and removing the one-piece shell from the shaping device.

15. The method of claim 14, wherein the steps of heating the one-piece shell and stretching or compressing the sole are performed after the one-piece shell is injection molded and after the plastic has been allowed to harden.

16. The method of claim 15, wherein the step of forming an aperture is performed by a partition during injection-molding, the aperture comprising a longitudinally-directed slit in one of a ball or heel area of the sole, the one-piece shell being hardened sufficiently when ejected from the mold cavity so that the slit maintains the shape of the partition.

17. The method of claim 15, wherein the step of forming an aperture comprises cutting the sole in a ball and/or heel area of the sole after ejecting the one-piece shell from the cavity.

18. The method of claim 15, comprising heating the one-piece shell in the shaping device prior to stretching or compressing the sole.

19. The method of claim 17, wherein the step of forming the aperture is performed when the one-piece shell is mounted on the shaping device.

20. The method of claim 14, wherein the step of forming the aperture is performed after the one-piece shell is ejected from the mold cavity.

21. The method of claim 20, wherein the step of heating the one-piece shell so that the plastic is in the soft state is performed when the one-piece shell is mounted on the shaping device.

22. The method of claim 20, wherein the step of forming the aperture comprises slitting the sole when the one-piece shell is soft and on the shaping device.

23. The method of claim 20, wherein during the step of stretching or compressing, the sole changes width only in the ball area and/or the heel area of the sole at and adjacent an aperture.

* * * * *